(12) United States Patent
Kedar

(10) Patent No.: US 8,893,900 B2
(45) Date of Patent: Nov. 25, 2014

(54) BICYCLE RACK

(71) Applicant: Alon Kedar, Ramat Hasharon (IL)

(72) Inventor: Alon Kedar, Ramat Hasharon (IL)

( * ) Notice: Subject to any disclaimer, the term of this patent is extended or adjusted under 35 U.S.C. 154(b) by 19 days.

(21) Appl. No.: 13/648,358

(22) Filed: Oct. 10, 2012

(65) Prior Publication Data

US 2013/0092645 A1 Apr. 18, 2013

Related U.S. Application Data

(60) Provisional application No. 61/545,623, filed on Oct. 11, 2011.

(51) Int. Cl.
*A47F 7/00* (2006.01)
*B62H 3/08* (2006.01)

(52) U.S. Cl.
CPC ........................................ *B62H 3/08* (2013.01)
USPC ............................................. 211/22; 211/20

(58) Field of Classification Search
CPC ............ E05B 71/00; B62H 3/00; B62H 3/08;
B62H 3/04; B62H 2003/00; B62H 2700/00;
B62H 2700/005; B62H 3/06; B62H 3/12;
B62H 3/10; B62H 3/02; B62H 5/00; B62H
5/005; B62H 1/02; B62H 1/04; B60R 9/10;
B60R 9/06; B60R 9/065; F16M 13/02;
A47F 10/04; A47F 7/04; A47B 81/007;
B65D 85/06; B62D 43/02; B62D 43/00;
B62D 43/005; B62D 43/007; A63B 22/06;
A63B 69/16; A63B 2069/16; A63B 2069/161;
A63B 2069/162; A63B 2069/164; A63B
2069/165; A63B 2069/166; A63B 2069/163;
B62J 19/00; B62J 23/00

USPC .................. 211/22, 20, 5, 19, 18, 17, 24, 23;
224/42.12, 42.13, 42.15, 42.16, 42.18,
224/42.19, 42.26; 482/57, 61; D12/115;
150/167; 248/346.01; 280/295, 297
See application file for complete search history.

(56) References Cited

U.S. PATENT DOCUMENTS

| | | | | |
|---|---|---|---|---|
| 529,939 A | * | 11/1894 | Noderer | 211/20 |
| 731,651 A | * | 6/1903 | Allen | 211/20 |
| 4,465,196 A | | 8/1984 | Erb | |
| 5,078,277 A | * | 1/1992 | Tschritter | 211/20 |
| 5,238,125 A | * | 8/1993 | Smith | 211/5 |
| 5,246,120 A | * | 9/1993 | Walker | 211/19 |
| 5,267,657 A | * | 12/1993 | McGuiness et al. | 211/22 |
| 5,372,169 A | * | 12/1994 | Norton et al. | 150/167 |
| 2,717,084 A | | 9/1995 | Groenedal | |
| 5,702,007 A | * | 12/1997 | Fritz et al. | 211/17 |
| 5,916,067 A | * | 6/1999 | Morasse | 482/61 |

(Continued)

FOREIGN PATENT DOCUMENTS

GB  2382554  9/2004

*Primary Examiner* — Jennifer E Novosad
(74) *Attorney, Agent, or Firm* — Mark M. Friedman

(57) ABSTRACT

A bicycle rack including a support structure defining at least a back groove portion having an upper and a lower end, and a base groove portion having a front and a rear end, wherein at least the base groove portion is formed with a central narrow groove for receiving a first width of tire, a wedge-angled slot configured to receive tires of a range of widths from a second width to a third width, the second width having a value greater than the first width and the third width having a value greater than the second width, and a transition portion connecting between the central narrow groove and the wedge-angled slot.

7 Claims, 15 Drawing Sheets

(56) References Cited

U.S. PATENT DOCUMENTS

| | | | |
|---|---|---|---|
| 5,984,111 A | 11/1999 | Pennella | |
| 6,062,396 A * | 5/2000 | Eason | 211/20 |
| 6,190,290 B1 * | 2/2001 | Mackert | 482/57 |
| D449,256 S * | 10/2001 | Kopacz et al. | D12/115 |
| 6,364,269 B1 * | 4/2002 | Hofer | 248/346.01 |
| 7,021,474 B2 * | 4/2006 | Garcia Simon et al. | 211/20 |
| 7,083,551 B1 * | 8/2006 | Lassanske et al. | 482/61 |
| 7,648,151 B2 * | 1/2010 | Pedrini | 280/292 |
| 7,690,516 B1 * | 4/2010 | Crump | 211/19 |
| 7,815,084 B2 * | 10/2010 | Allen et al. | 224/537 |
| 2006/0237376 A1 * | 10/2006 | Eakin | 211/20 |
| 2008/0223800 A1 * | 9/2008 | Cole | 211/22 |
| 2011/0036474 A1 * | 2/2011 | Phillips | 150/167 |
| 2011/0220594 A1 * | 9/2011 | Chuang | 211/22 |
| 2012/0037286 A1 * | 2/2012 | Wilkinson et al. | 150/167 |
| 2012/0145292 A1 * | 6/2012 | Saggau et al. | 150/167 |
| 2013/0092645 A1 * | 4/2013 | Kedar | 211/85.1 |

* cited by examiner

BICYCLE RACK

FIELD AND BACKGROUND OF THE INVENTION

The present invention relates to bicycle racks in general, and to providing methods for storing a bicycle of any wheel size.

The term "bicycle" will be used to encompass all two-wheeled vehicle of transport, including electrically-powered bicycles. The term "rack" and "stand" are used interchangeablely. Bicycle stands are well known and come in a variety of forms for both indoor and outdoor use.

The prior art offers a plethora of solutions to the problem of propping up and holding a stationary bicycle steady.

Various bicycle racks that hold a bicycle in an upright position have been proposed. In some cases, a wheel is guided into a channel or groove, thereby supporting the wheel so that the bicycle does not topple over. A sample of patents for such racks follows.

U.S. Pat. No. 5,984,111 to Pannella and titled "Bicycle Rack" describes a lockable bicycle rack having a channel member for holding the wheels, the channel having holes at the location of the wheels where a slidable U-shaped locking member and a central bar region join two end bars.

U.S. Pat. No. 4,465,196 to Erb and titled "Bicycle Rack" describes a bicycle rack made of a continuous piece of stiff wire bent into an M-shape in such a way that allows a tire to be wedged into it. The tire-wedging members are outwardly diverging and inwardly converging.

U.S. Pat. No. 5,078,277 to Tschritter and titled "Water-Filled Bicycle Rack" describes a hollow molded plastic body which may be filled with water or sand having an arcuate recess in an inclined front surface for admitting a bicycle wheel.

U.S. Pat. No. 5,267,657 to McGuiness et al. and titled "Bicycle Stand" describes a molded or formed plastic body having receptacles for ballast and one or more grooves for receiving the wheel of a bicycle of one or more sizes. The patent refers to one or more grooves that are separate from one another and occupy different positions within the stand.

There is a need to address the issue of a bicycle stand that has the capability to prop up a bicycle by admitting multiple sizes of bicycle wheel.

It would be highly advantageous to have a single device for storing a range of bicycle sizes.

SUMMARY OF THE INVENTION

According to the present invention there is provided a bicycle rack including a support structure defining at least a back groove portion having an upper and a lower end, and a base groove portion having a front and a rear end, wherein at least the base groove portion is formed with a central narrow groove for receiving a first width of tire, a wedge-angled slot configured to receive tires of a range of widths from a second width to a third width, the second width having a value greater than the first width and the third width having a value greater than the second width, and a transition portion connecting between the central narrow groove and the wedge-angled slot.

According to further features in preferred embodiments of the invention described below the back groove portion and the base groove portion are integrally formed as part of a single body.

According to still further features in the described preferred embodiments, the upper end of the back groove portion includes an open-backed wedge-angled slot narrowing rearwards to an open slot of a fourth width, wherein the open slot narrows downwards.

According to another feature in the described preferred embodiments, the wedge-angled slot has outwardly diverging walls having a wedge angle of between 10° and 40°.

According to yet another feature in the described preferred embodiments, the central narrow groove has outwardly diverging walls having an angle of between 1° and 35°.

According to another feature in the described preferred embodiments, the base groove portion has at least a part of the base groove portion that is downwardly inclined towards the back groove portion.

According to yet another feature in the described preferred embodiments, the front end has a raised grip that is shaped to grip tires.

According to another feature still in the described preferred embodiments, the single body includes a localized, tapered restriction at a location intermediate between the base groove portion and the back groove portion and configured to provide at least an additional pair of grip surfaces for the tires, formed as part of the single body.

According to yet another embodiment of the present invention, the bicycle rack further comprises a cover support member for supporting at least one of: a cover, a helmet, a pair of gloves, a reflective jacket, a pair of knee pads, a pair of sunglasses, and a pair of cycle clips, the cover support member including at least one vertical support pole that is interconnected at the lower extremity of the at least one vertical support pole with the bicycle rack.

According to another embodiment of the present invention, there is provided a bicycle rack including a support structure defining at least a back groove portion having an upper and a lower end, and a base groove portion having a front and a rear end, wherein at least the upper end of the back groove portion includes an open-backed, wedge-angled slot, narrowing rearwards to an open slot, wherein the open slot narrows downwards.

According to another embodiment of the present invention, the bicycle rack further comprises a rear skirt portion circumscribing the open-backed wedge-angled slot.

According to further features in preferred embodiments of the invention described below the back groove portion and the base groove portion are integrally formed as part of a single body.

According to still further features in the described preferred embodiments, the wedge-angled slot has outwardly diverging walls having a wedge angle of between 10° and 40°.

According to another feature in the described preferred embodiments, the support structure further includes a central narrow groove wherein the central narrow groove has outwardly diverging walls having an angle of between 1° and 35°.

According to a further feature in the described preferred embodiments, the base groove portion has at least a part of the base groove portion that is downwardly inclined towards the back groove portion.

According to yet another feature in the described preferred embodiments, the front end has a raised grip that is shaped to grip tires.

According to a further feature in the described preferred embodiments, the single body includes a localized, tapered restriction at a location intermediate between the base groove portion and the back groove portion and configured to provide at least an additional pair of grip surfaces for the tires, formed as part of the single body.

According to another embodiment of the present invention, there is provided a bicycle rack including a support structure defining at least a back groove portion having an upper and a lower end, and a base groove portion having a front and a rear end, wherein the support structure is part of an object comprising at least one storage compartment, at least part of the object being formed from an injection molded polymer.

According to further features in preferred embodiments of the invention described below the back groove portion and the base groove portion are integrally formed as part of a single body.

According to still further features in the described preferred embodiments, the upper end of the back groove portion includes an open-backed wedge-angled slot narrowing rearwards to an open slot, wherein the open slot narrows downwards.

According to still further features in the described preferred embodiments, the wedge-angled slot has outwardly diverging walls having a wedge angle of between 10° and 40°.

According to another feature in the described preferred embodiments, the support structure further includes a central narrow groove wherein the central narrow groove has outwardly diverging walls having an angle of between 1° and 35°.

According to a further feature in the described preferred embodiments, the base groove portion has at least a part of the base groove portion that is downwardly inclined towards the back groove portion.

According to yet another feature in the described preferred embodiments, the front end has a raised grip that is shaped to grip tires.

According to a further feature in the described preferred embodiments, the single body includes a localized, tapered restriction at a location intermediate between the base groove portion and the back groove portion and configured to provide at least an additional pair of grip surfaces for the tires, formed as part of the single body.

The present invention successfully addresses the shortcomings of the presently known configurations by providing a solution for most wheel sizes.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

The principles and operation of a bicycle rack according to the present invention may be better understood with reference to the figures and the accompanying description.

By way of introduction, the present invention has several aspects, each of which is believed to be of patentable significance in its own right, and which are most preferably used in combination. A first aspect of the invention relates to a particular structure of a base groove portion that has been found to be particularly effective for gripping bicycle tires of a wide range of dimensions. A second aspect relates to a particular structure of a back groove portion that has been found to be particularly effective for gripping bicycle tires of a wide range of dimensions. Each of these groove portion structures may be used as part of an otherwise conventional bicycle rack, but are of particular advantage when used in synergy within a single bicycle rack, as will be exemplified below. A further aspect of the present invention relates to integration of one or more storage compartment as part of the bicycle rack. These and other patentable features will all become clearer from the following description with reference to the accompanying drawings.

Figure 1:
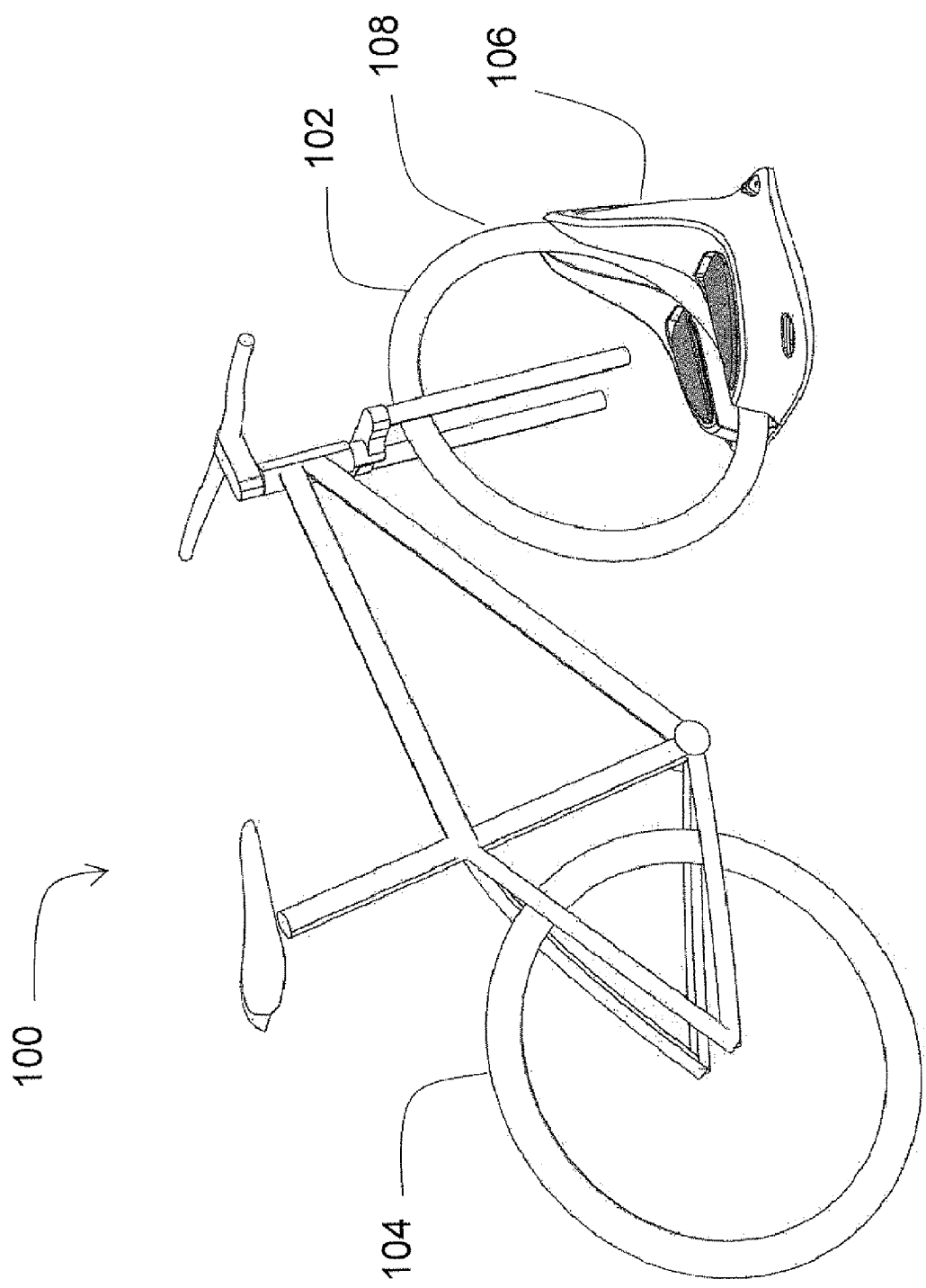
FIG. 1 is a schematic representation of a bicycle held in a bicycle rack.

Referring now to the figures, FIG. 1 is a schematic representation of a bicycle, generally referenced 100, held in a bicycle rack. Bicycle 100 has a front wheel 102 and a rear wheel 104. Front wheel 102 is held in an upright position by a bicycle rack 106. A tire 108 of front wheel 102 is wedged in a groove (not shown) of bicycle rack 106. When front wheel 102 of bicycle 100 is kept in an upright position, the weight of bicycle 100 is supported by the tires 108 alone. Keeping bicycle 100 vertical alleviates pressure on the rim and spokes of the wheel. It is well known that pressure on the spokes of a parked bicycle wheel eventually causes the wheel to be out of true. In the present invention, the spokes preferably do not make contact with the rack. Preferably, when the rear wheel 104 of a bicycle having derailleur gears is held in bicycle rack 106, there is sufficient clearance for the gear mechanism.

FIGS. 2-8 show various views of a bicycle rack, generally referenced 200.

Figure 2:
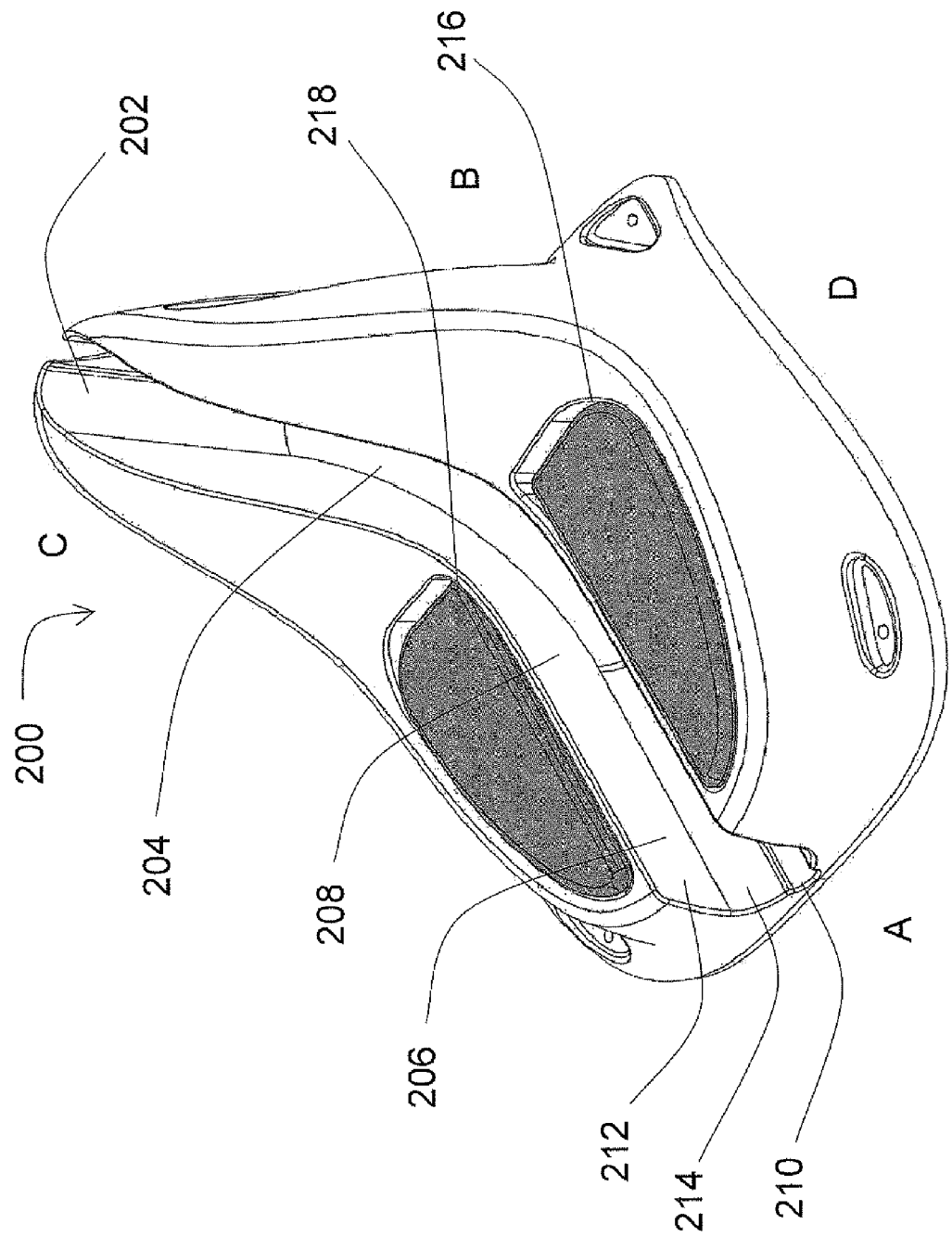
FIG. 2 is a perspective illustration of a simplified bicycle rack.

FIG. 2 illustrates a perspective view of a bicycle rack. For convenience of description, reference will be made to four sides of bicycle rack 200. The four sides are: a front side A, a rear side B, an upper side C, and a lower side D. Bicycle rack 200 shows a groove running from upper side C, to front side A. The groove is divided into a back groove portion running from C towards D and a base groove portion running from A towards B. The back groove portion is further divided into an upper back groove portion 202 and a lower back groove portion 204. The base groove portion is similarly divided into a front base groove portion 206 and a rear base groove portion 208. The groove is formed from a floor 210, a wedge-angled slot 212, and a transition portion 214 in between. The floor 210 of the groove has a width that tends to fit the narrowest tires for which the bicycle rack is to be used, typically of width around 22.4 mm, referred to in the claims as a first width of tire. Tires wider than 22.4 mm may grip the transition portion 214 or surfaces of the wedge-angled slot 212, and may not touch the floor 210, depending on their flexibility and shape. Such tires are referred to in the claims as tires of a second and third width. Smaller diameter wheels tend to be stopped and gripped by the lower back groove portion 204.

Larger diameter wheels tend to be stopped and gripped by the upper back groove portion 202. Upper back groove portion 202 is open-backed to allow a portion of the wheel to protrude out of the bicycle rack, while keeping bicycle rack 200 compact in size. Any given tire may be gripped by the upper back groove portion 202 as a result of two mutually-perpendicular taperings: A rearward tapering and a downward tapering of the surfaces indicated in FIG. 6. FIG. 2 also illustrates a right storage compartment 216 and a left storage compartment 218.

In the preferred implementation of the support structure of the present invention, there are no moving parts, unlike certain bicycle racks in the prior art.

In the prior art, bicycle racks tended to be made out of metal, which was bent into a groove. In the current invention, the bicycle rack is fabricated out of a lighter material, which lends itself to be molded into any shape without adding considerable weight to the object. Furthermore, bicycles require maintenance and have a number of accessories (for example, a pump, a puncture repair kit, a spanner, an oil can, and gloves) that need to be stored along with the bicycle. Consequently, it was found to be convenient to include at least one, and preferably two, storage compartments in the molded polymer. Such storage compartments may also be removable. In one embodiment, the compartments are insertable in the openings in the molded polymer.

Figure 3:
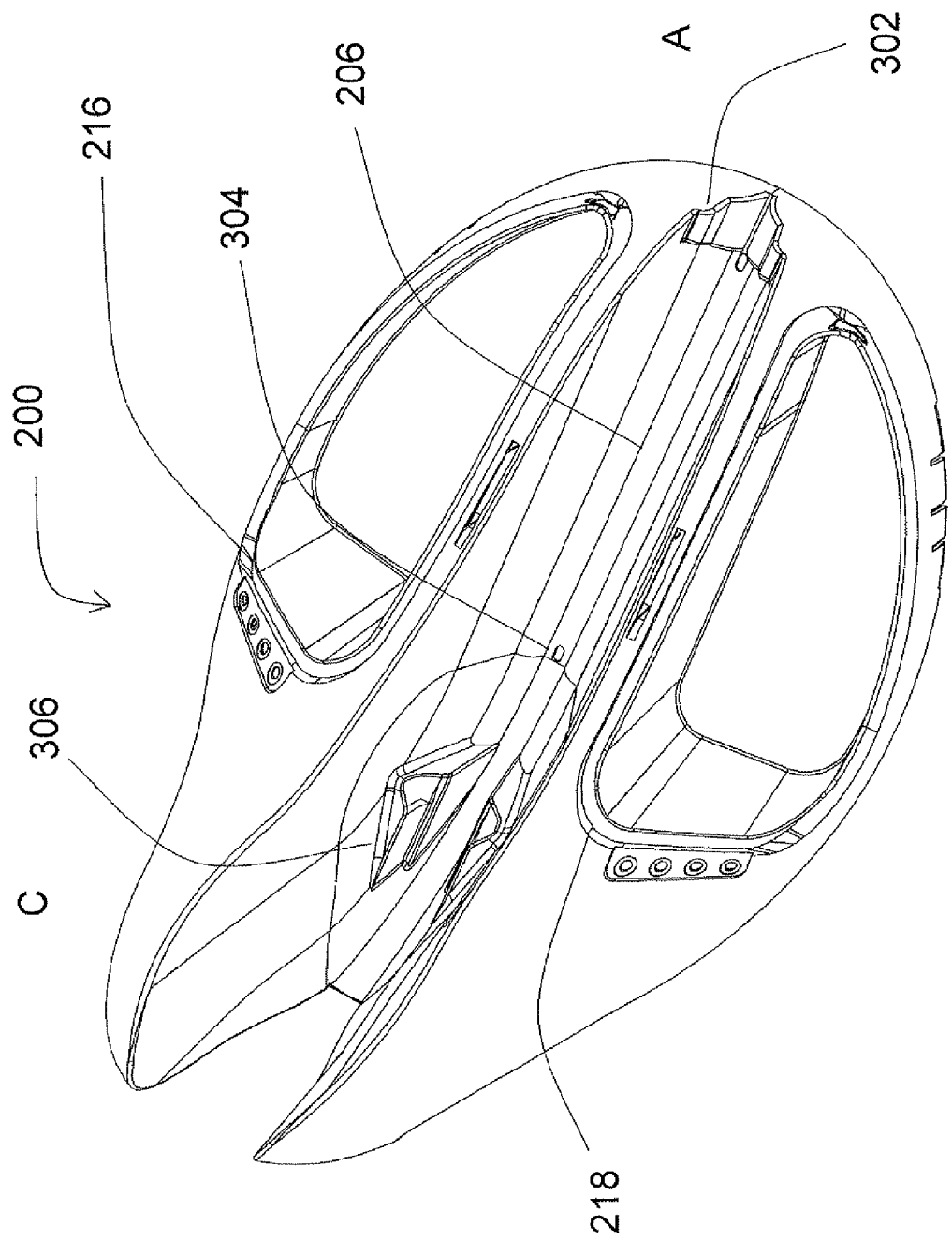
FIG. 3 is a perspective illustration of a bicycle rack, showing some features.

FIG. 3 illustrates a perspective view of the groove of a bicycle rack. Bicycle rack 200 shows a raised grip 302 at front side A. Front base groove portion 206 extends from front side A towards rear side B. In FIG. 3, a drainage hole 304 lies between front base groove portion 206 and rear base groove portion 208. One or more drainage holes may be located at various points along the base groove portion. Localized tapered restriction 306 is typically located in the corner of bicycle rack 200, between rear base groove portion 208 and lower back groove portion 204. Right storage compartment 216 and left storage compartment 218 are illustrated without the covers.

Figure 4:
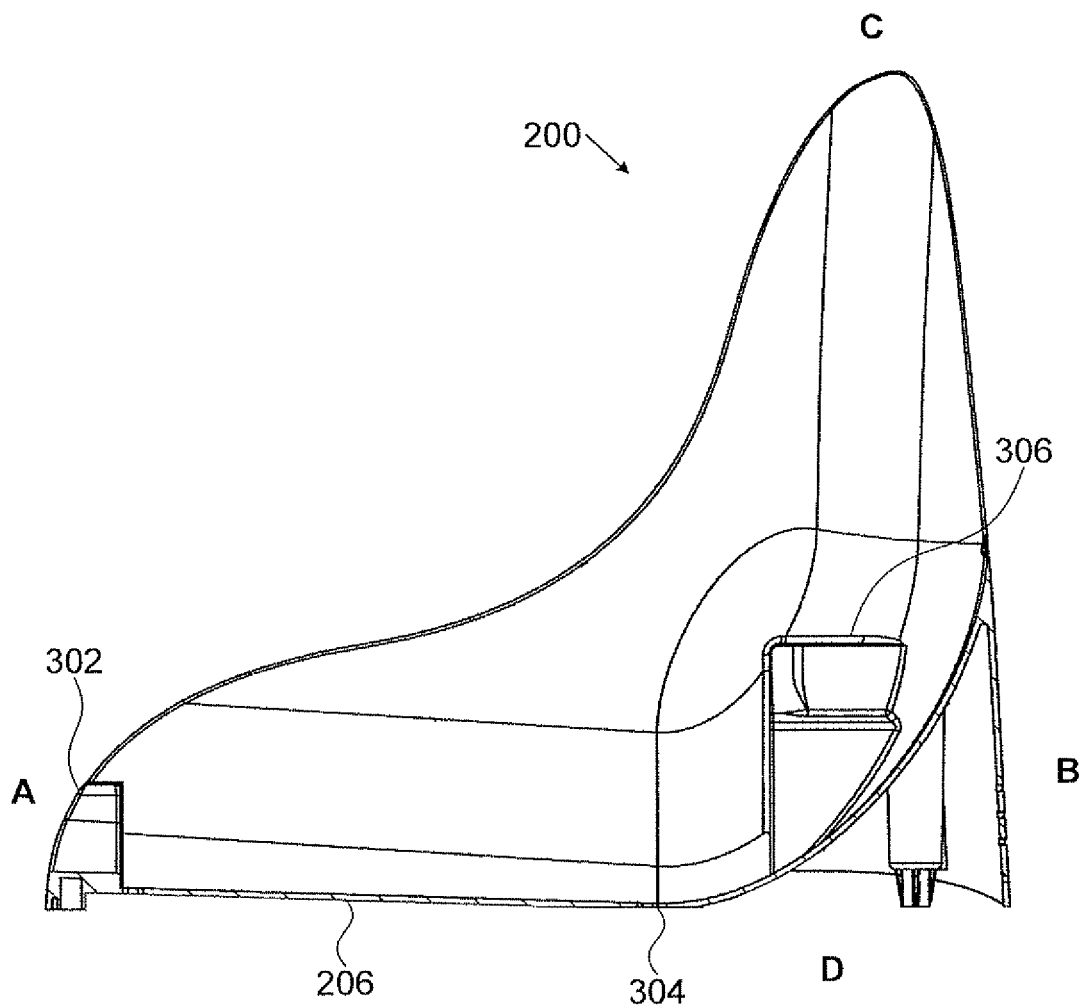
FIG. 4 is a cross section of one half of a bicycle rack, delineating the groove.

In certain particularly preferred embodiments, a plane of symmetry runs down the center of the groove the bicycle rack. FIG. 4 is a cross-section, taken in the plane of symmetry. Bicycle rack 200 shows a raised grip 302 at front side A. Front base groove portion 206 slopes downwards from front side A to drainage hole 304. Drainage hole 304 drains water that collects in front and rear base groove portions 206 and 208. Rear base groove portion 208 curves upward to restrict the motion of the wheel. In this embodiment, localized, tapered restriction 306 is shown as having two steps extending out to grip the wheel.

Figure 5:
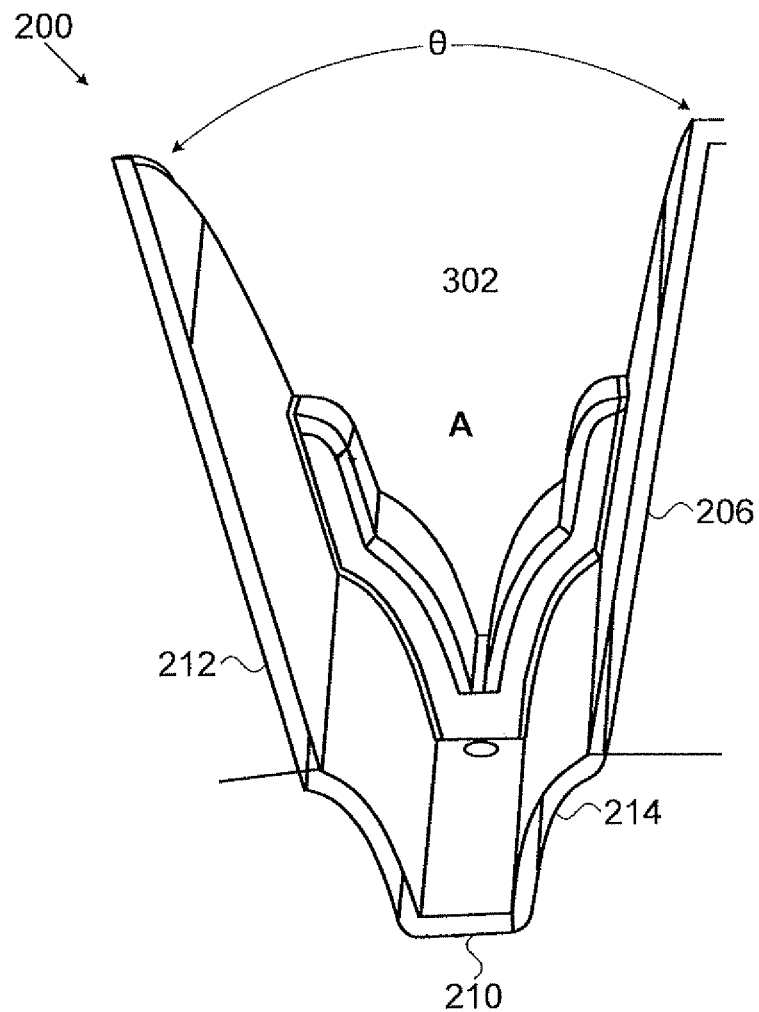
FIG. 5 is a view of the front base groove portion of a bicycle rack.

FIG. 5 is a cross-sectional illustration of front base groove portion 206 of the groove as viewed from the back towards front side A. Raised grip 302 is shown in the middle of front base groove portion 206, at front side A. In this embodiment, raised grip 302 is shown as a raised section of front base groove portion 206. In this embodiment, front base groove portion 206 has a cross-section that is substantially identical to rear base groove portion 208 and lower back groove portion 204. Front base groove portion 206 has a floor 210, a transition portion 214, and a wedge-angled slot 212.

Floor 210 is generally horizontal, preferably sloping towards rear side B in order to facilitate the rolling of a wheel towards the rear side B. Drainage holes are preferably located at the lowest point. Front base groove portion 206 is designed for receiving a first width of tire that touches the floor 210, of width typically around 22.4 mm. As front base groove portion 206 broadens above the floor to form wedge-angled slot 212, front base groove portion 206 is configured to receive tires of widths typically ranging from 1.7" to 2.4".

Transition portion 214 of the groove typically has convex walls. The geometrical form of transition portion 214 is typically not critical, but preferably has a smooth curvature to avoid damage to tires. In the particularly preferred but non-limiting example shown here, a cross-section of the curve described by transition portion 214 has a value on the horizontal (X) axis of 13 mm and a value of 23 mm on the vertical (Y) axis. A tangent to the curves either side, at the points of intersection with floor 210, subtends an angle (referred to as the diverging walls of the central narrow groove in the claims) of preferably between 1° and 35°, more preferably between 10° and 20°, and most preferably 16°. A tangent to the curves either side, at the points of intersection with wedge-angled slot 212, subtends an angle of preferably between 120° and 180°, more preferably between 140° and 160°, and most preferably 147°.

Wedge-angled slot 212 is V-shaped and has substantially planar walls that subtend an angle $\theta$, as shown in FIG. 5. More particularly, the two outwardly diverging walls of wedge-angled slot 212 can be viewed as two planes that, when extrapolated downwards, intersect at a point below the floor 210, subtending an angle $\theta$.

In one embodiment, angle $\theta$ is in the preferred range of between 20° and 30°, and typically around 25°, but may also lie in the range 10° to 40°.

In another embodiment, front base groove portion 206 has a cross-section that is substantially similar to rear base groove portion 208 and lower back groove portion 204.

In another possible configuration, lower back groove portion 204 and rear base groove portion 208 form an integral body.

In yet another embodiment, the support structure is part of an injection molded polymer object comprising at least one storage compartment. Storage compartments may be integrally formed or removable. Typically, removable storage compartments are insertable in openings in the injection molded polymer object.

Figure 6:
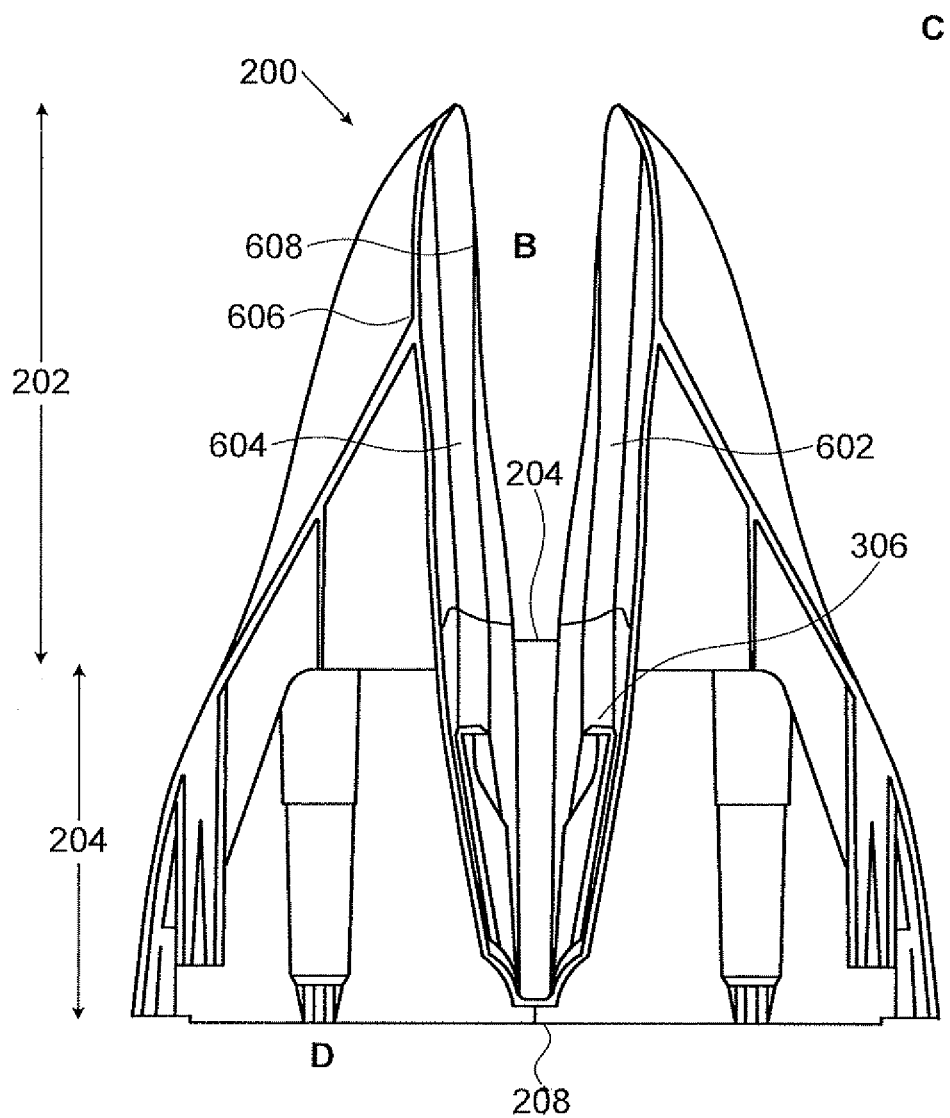
FIG. 6 is a view of the rear base groove portion of a bicycle rack.

FIG. 6 is an illustration of a cross-section through upper 202 and lower 204 back groove portion, viewed from localized tapered restriction 306 towards rear side B. Rear base groove portion 208 curves upwards to form lower back groove portion 204. Above the lower back groove portion 204, upper back groove portion 202 has an open back. The open back, or slot, of upper back groove portion 202 permits wheels of a larger diameter to protrude out of the bicycle rack. The slot, at its narrowest point, has a fourth width that is preferably in the range of 10 mm to 30 mm, and most preferably 20 mm. This width is preferably less than the width of the narrowest tire expected to be encountered to ensure that such tires are effectively gripped. Upper back groove portion 202 has wedge-angled sides 602 and 604 on the right and on the left, respectively. Wedge-angled sides 602 and 604 narrow downwards towards lower side D, preferably subtending an angle between them in the vertical plane of between 4° and 8°. Wedge-angled sides 602 and 604 also narrow rearwards, towards rear side B, preferably subtending an angle between the two sides in the horizontal plane of between 27° and 45°. As a consequence, front edge 606 of wedge-angled side 604 has a wider opening than rear edge 608 of wedge-angled side 604. Generally, and particularly for relatively large-diameter wheels, when considering wedge-angled sides 602 and 604, wider (thicker) tires are gripped by the rearward narrowing in the horizontal plane, while narrower (thinner) tires are gripped by the downward narrowing in the vertical plane.

In a further configuration, upper back groove portion 202 includes a rear skirt portion circumscribing the open-backed wedge-angled slot in order to act as a buffer for wheels that protrude out of the bicycle rack 200.

Figure 7:
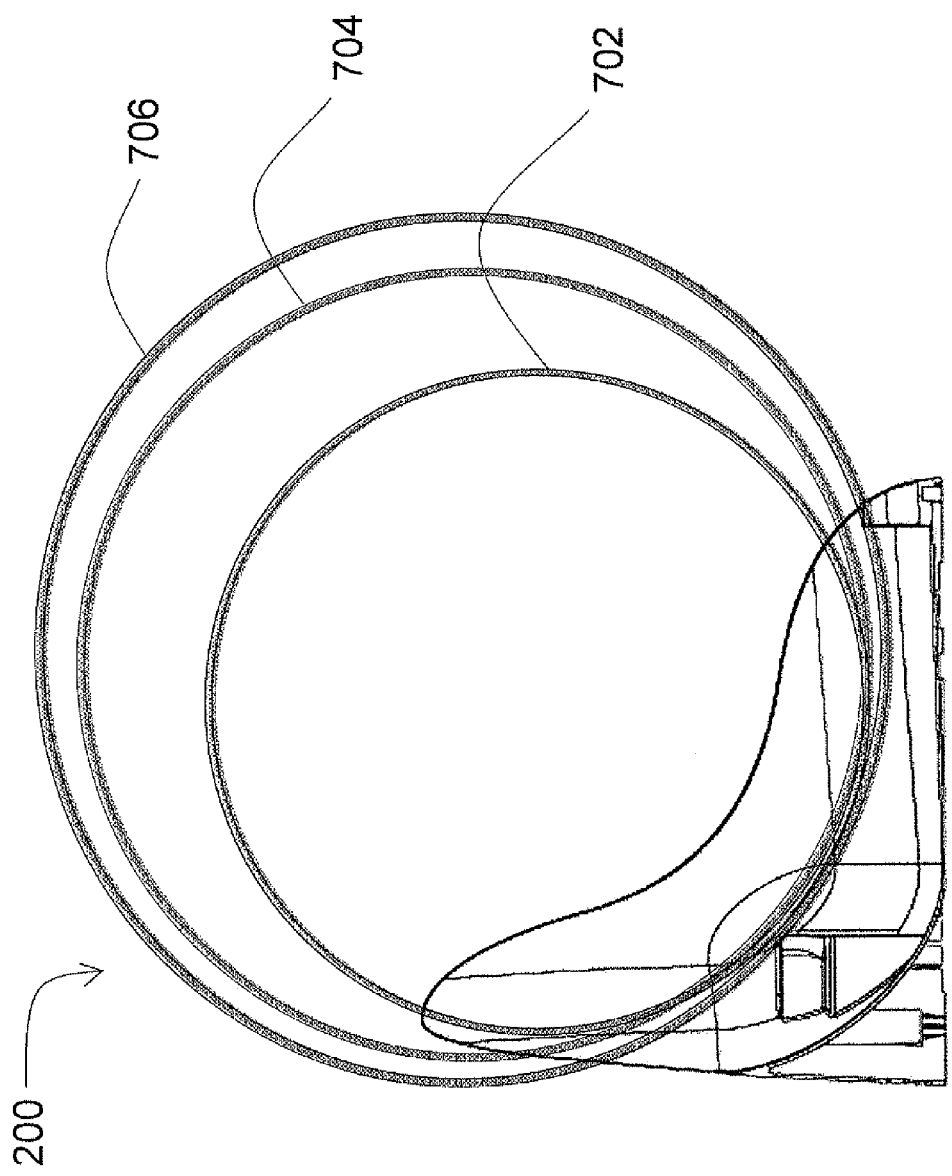
FIG. 7 is an illustration of three tires of similar widths wedged in a bicycle rack.

FIG. 7 is an illustration of three tires of similar widths, wedged in bicycle rack. Small tire 702 measures 20"×2". Medium tire 704 measures 24"×1.95". Large tire 706 measures 26"×2". All three tires make contact with the upper step of localized, tapered restriction 308. All three tires make contact with front base groove portion 206. Only large tire 706 makes contact with raised grip 302. At rear side B, only the two larger tires 704 and 706 are high up enough and protrude out of bicycle rack 708 far enough to contact the narrowing in the horizontal plane of wedge-angled sides 602 and 604 of upper back groove portion 202. Small tire 702 contacts the downward narrowing in the vertical plane of wedge-angled sides 602 and 604.

Figure 8:
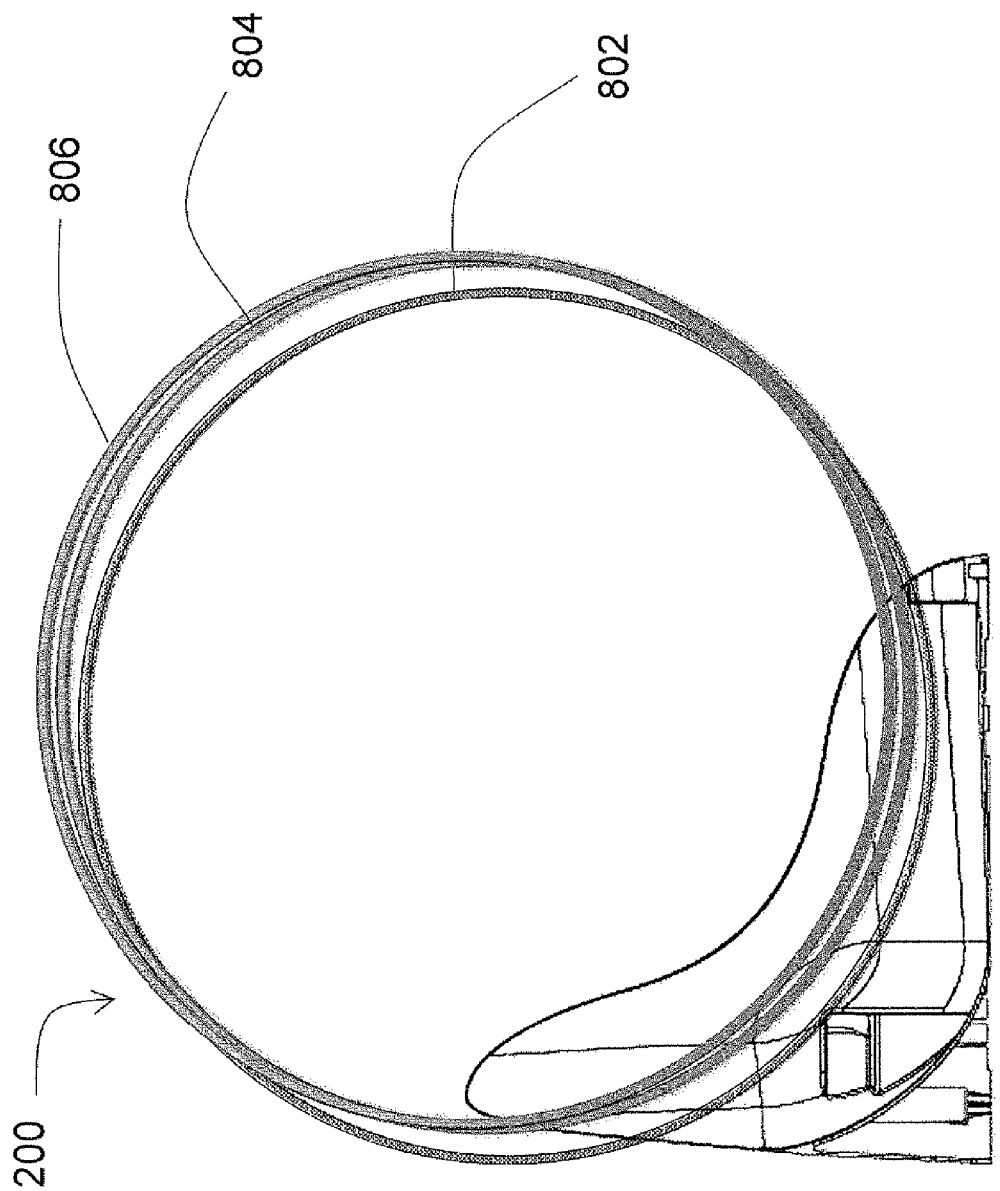
FIG. 8 is an illustration of three tires of similar diameters wedged in a bicycle rack.

FIG. 8 is an illustration of three tires of differing widths on wheels of similar diameter, wedged in bicycle rack. First width tire 802 measures 26"×2". Second width tire 804 measures 26"×2.1". Third width tire 806 measures 26"×2.4". With respect to front 206 and rear 208 base groove portions, third width tire 806 is held higher in the groove than tires 802 and 804, at a point where the groove is wider. Tires 802, 804, and 806 are expected to sit at varying heights on wedge-angled slot 212 of the base groove portion. Floor 210 has a maximum width of 22.4 mm (0.88"). This grips the narrowest bicycle tire commonly found on the road. With respect to upper 202 and lower 204 back groove portions, tires 802, 804, and 806 contact the narrowing in the horizontal plane of wedge-angled sides 602 and 604 of upper back groove portion 202 but have too large a diameter to contact the downward narrowing in the vertical plane.

Wheels of diameter 29" (not shown) have tires that grip surfaces on wedge-angled sides 602 and 604. Wheels of diameter 700 mm (27.5") (not shown) have tires that grip localized tapered restriction 306. Wheels of diameter 26", depending on their thickness, tend to grip localized tapered restriction 306, as shown in FIG. 8.

FIGS. 9-14 show methods of storing bicycle 100 in an upright position, with the front wheel raised above the rear wheel. It should be noted that although the illustrations show bicycle 100 stored in the manner shown, the invention is in no way limited to these examples of upright storage. In FIGS. 9-14, the rear wheel of bicycle 100 is directed into bicycle rack 200.

Figure 9:
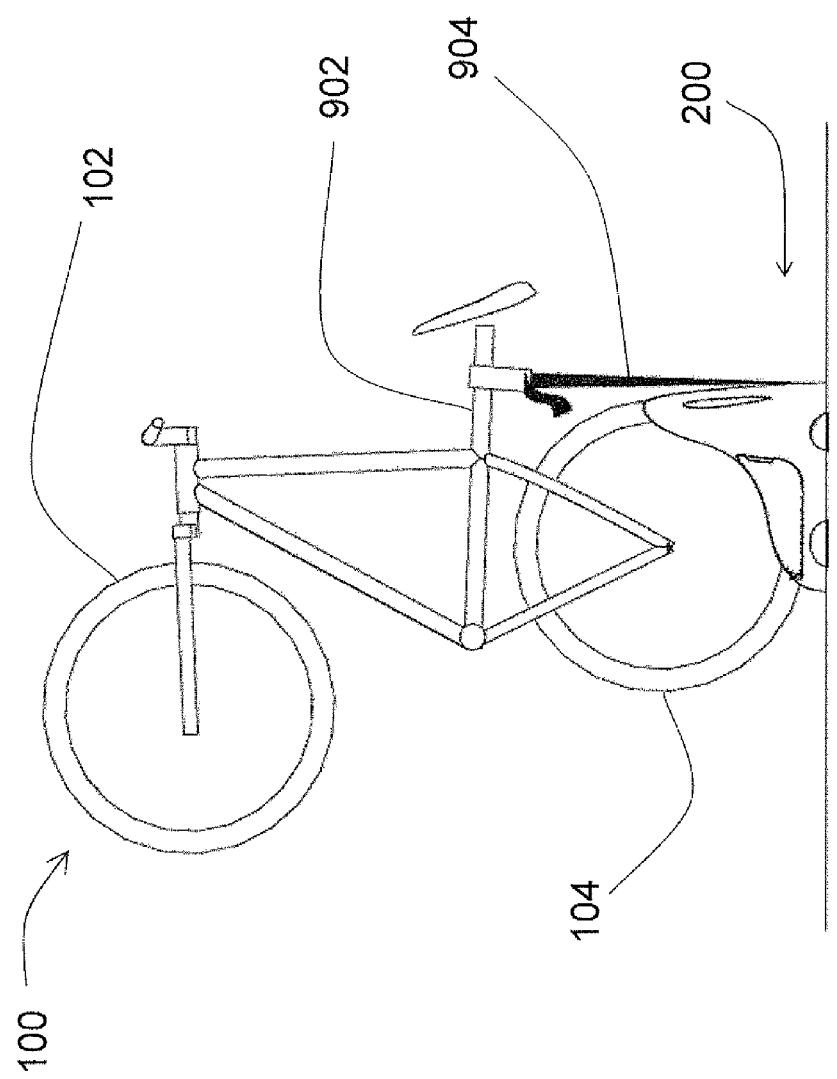
FIGS. 9-14 are a schematic illustration of examples of storing a bicycle in an upright position.

In FIG. 9, the saddle stem 902 is attached by a strap 904 to bicycle rack 200, and the front wheel 102 is suspended in the air. The bicycle 100 is held in a stable position since the back wheel 104 is gripped tightly by the bicycle rack 200.

Figure 10:
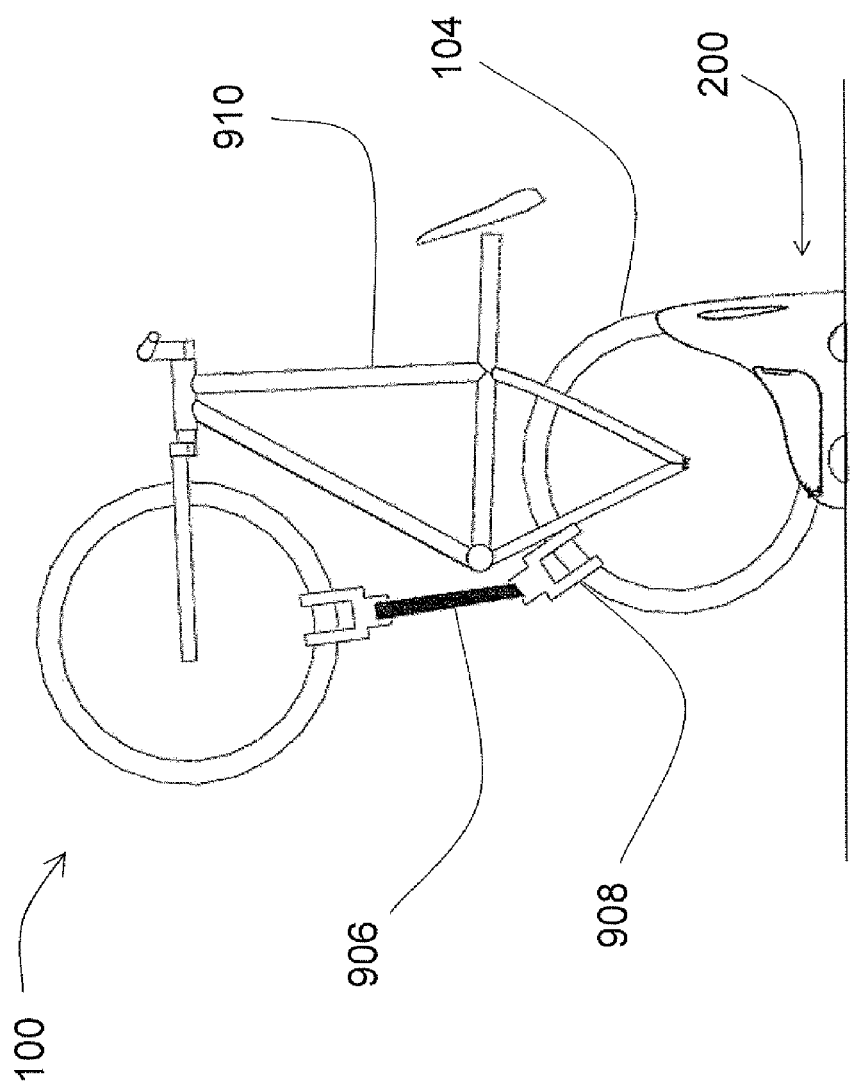

In FIG. 10, the front and rear wheels are held together by a strap 906. The clamp 908 on the back wheel 104 is locked against the frame 910 to prevent movement.

Figure 11:
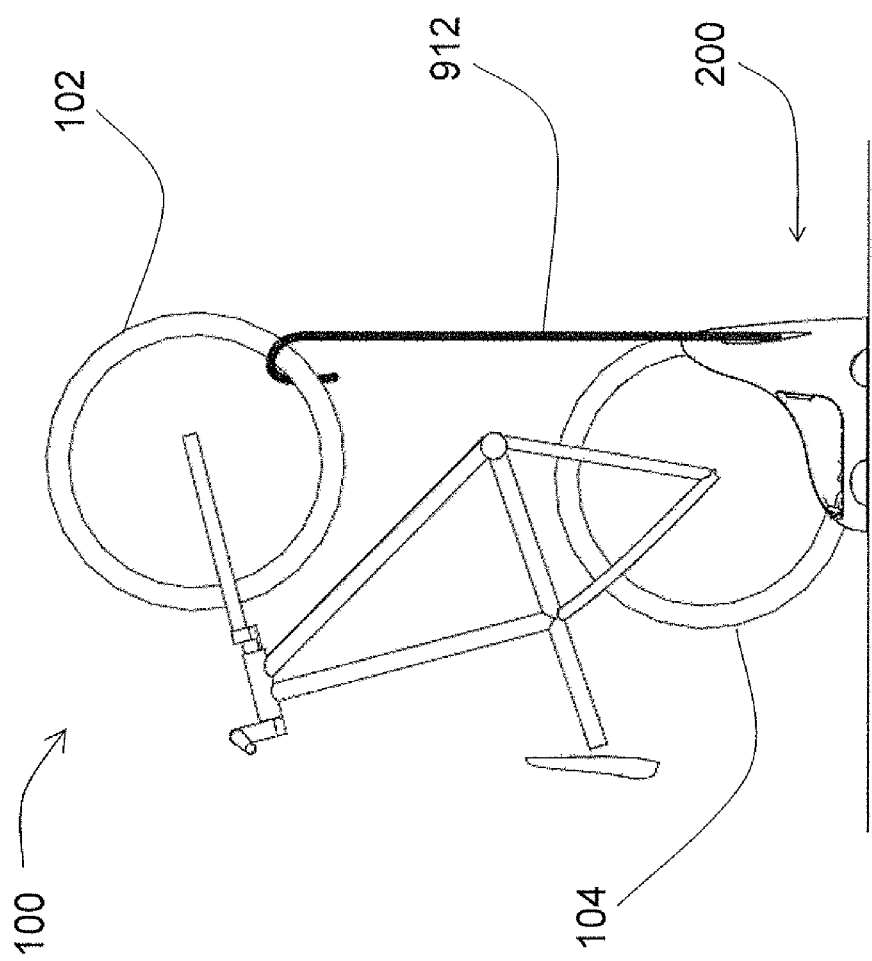

In FIG. 11, the front wheel 102 is held steady by a hooked pole 912 that is inserted into a slot in bicycle rack 200. The front wheel 102 is prevented from turning and the back wheel 104 is gripped tightly by the bicycle rack 200.

Figure 12:
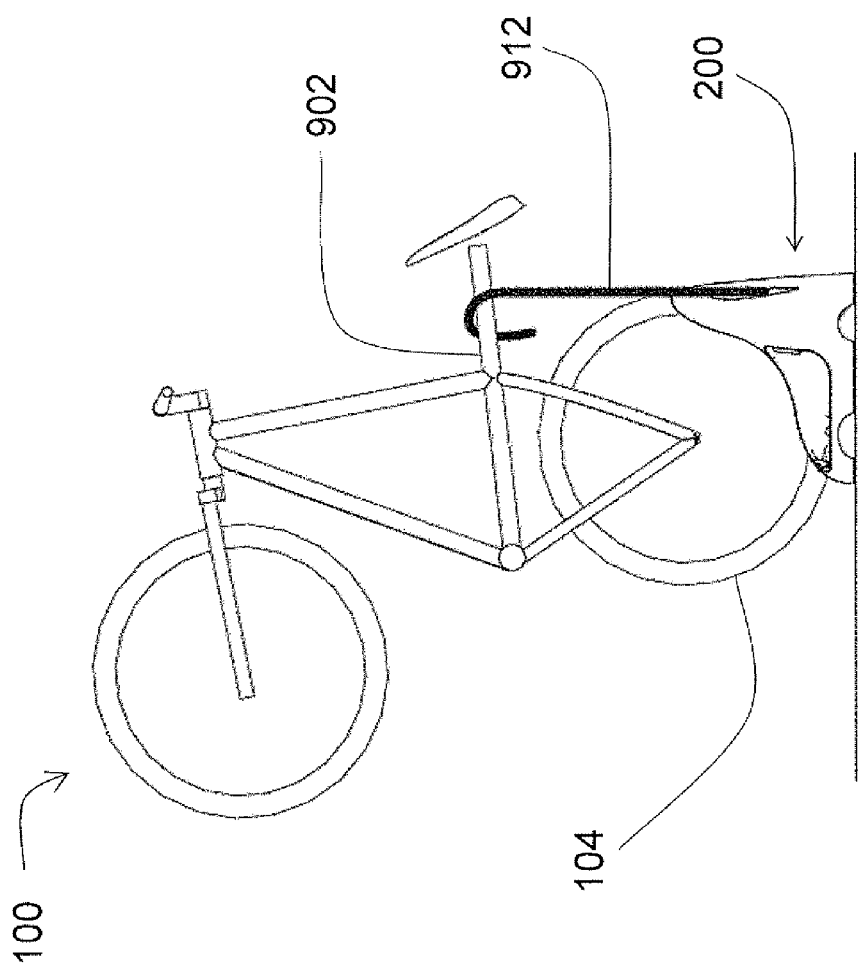

In FIG. 12, a hooked pole 912 of a shorter variety to that shown in FIG. 11 attaches the saddle stem 902 to bicycle rack 200 by insertion therein. The back wheel 104 is gripped tightly by the bicycle rack 200.

Figure 13:
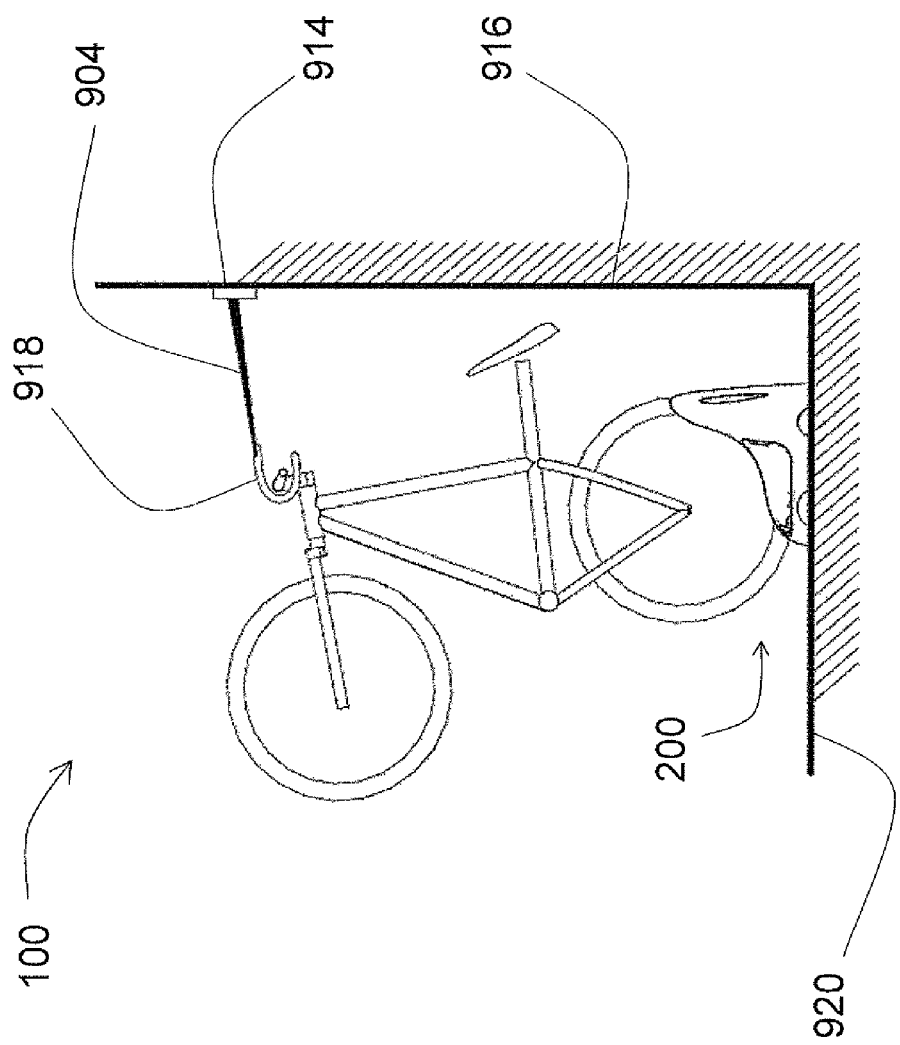

In FIG. 13, an anchorage point 914 on the wall 916 is attached by a strap 904 to the handlebars 918. Bicycle rack 200 is fixed to the ground 920.

Figure 14:
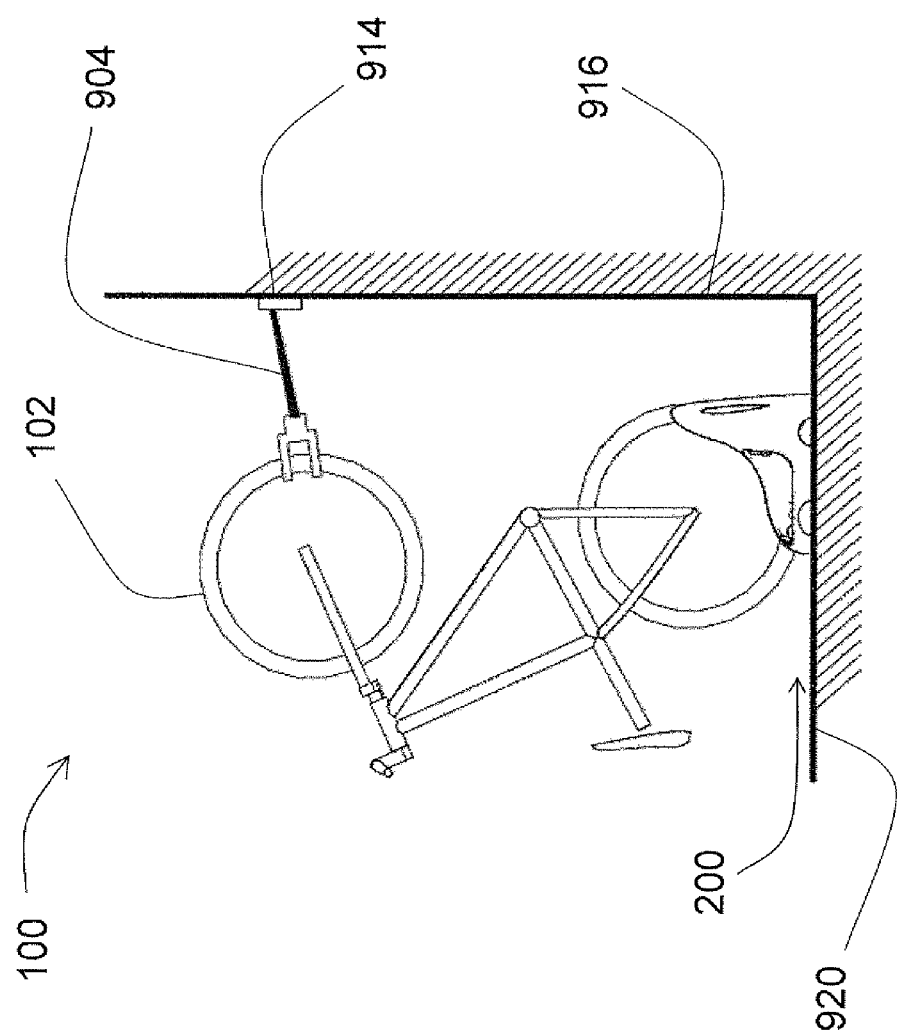

In FIG. 14, an anchorage point 914 on the wall 916 is clamped by a strap 904 to the front wheel 102. Bicycle rack 200 is fixed to the ground 920.

Figure 15:
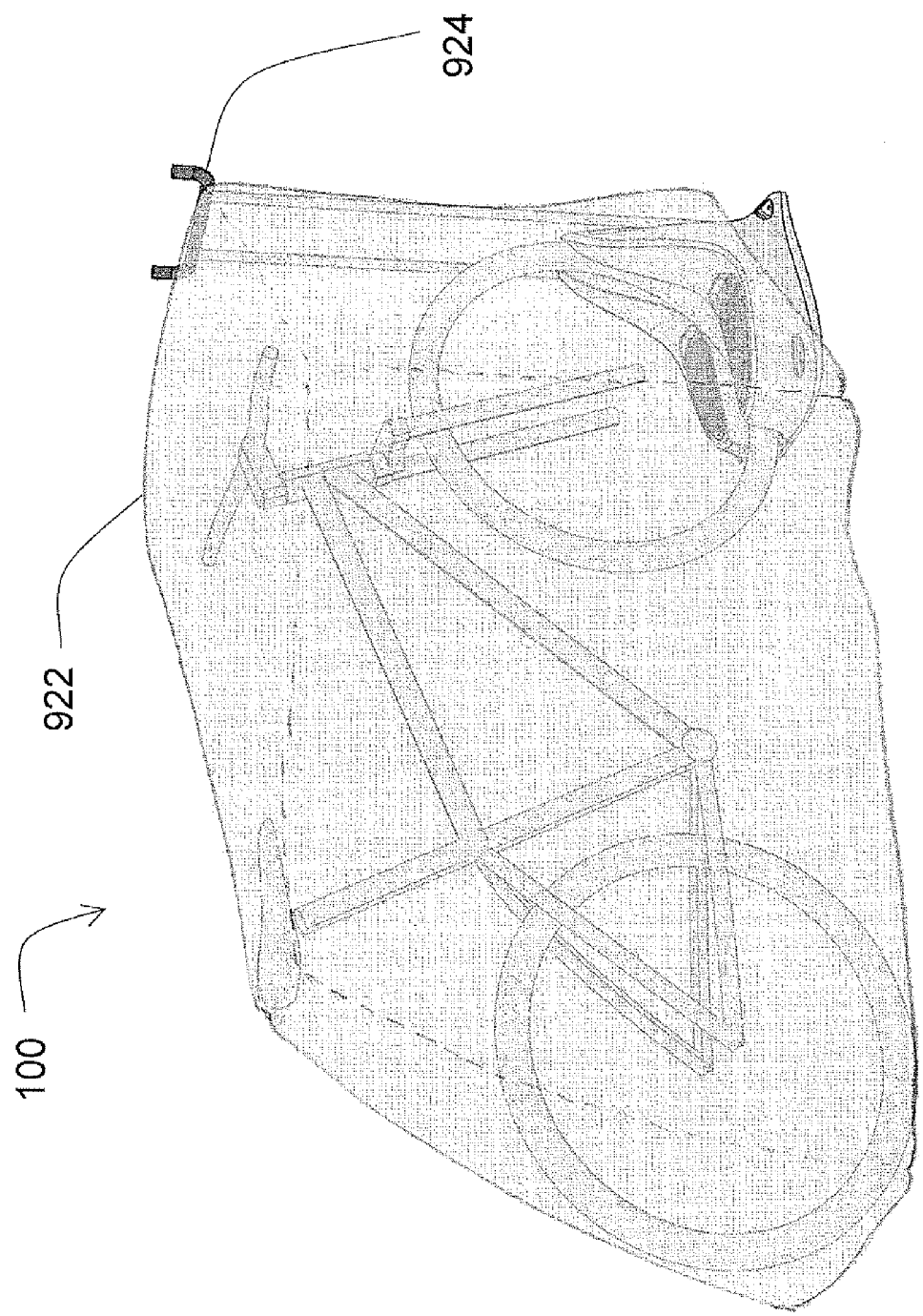
FIG. 15 is a schematic representation of a bicycle rack according to the teachings of an embodiment of the present invention integrated with a cover that protects a bicycle.

FIG. 15 is schematic representation of another non-limiting embodiment, where bicycle 100 is protected from the elements by a cover 922. Cover 922, which may, for example, be a tarpaulin, is spread over bicycle 100, and is supported by the saddle of bicycle 100 and at least one member, typically a support pole 924. A lower extremity of the support pole is interconnected with the bicycle rack 200, typically by insertion into an opening in the bicycle rack 200. In an alternative implementation, the support pole may be integrally formed with at least part of bicycle rack 200. Support pole 924, which, in another embodiment, may be a pair of poles, are connected to one another at the top extremity by a horizontal member which extends outwards beyond the poles to provide a pair of hooks for hanging gloves, a helmet, and other paraphernalia.

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A bicycle rack for supporting a bicycle with one wheel elevated to assume a vertical storage position, the bicycle rack comprising:
    (a) a support structure defining at least a rear groove portion for gripping a first region of a tire and a front groove portion for gripping a second region of the tire, said support structure configured for free-standing use on an underlying flat surface; and
    (b) a support pole attached to said support structure so as to stand upright, said support pole having an engagement portion configured for engaging a saddle or saddle post so as to allow vertical storage of the bicycle when the bicycle is raised into a vertical storage position with the tire of its rear wheel engaged with said support structure and its front wheel extending upwards beyond said engagement portion,
wherein said support pole is attached to said support structure such that a length axis of said support pole is in a fixed angular relation to said support structure.

2. The bicycle rack of claim 1, wherein said engagement portion of said support pole is configured for substantially encircling the saddle post of the bicycle.

3. The bicycle rack of claim 1, wherein said support structure is formed at least in part from a molded plastic support body.

4. A combination of the bicycle rack of claim 1 with a bicycle, said bicycle having a front wheel and a back wheel both attached to a frame, wherein said bicycle is supported with said back wheel engaged with said support structure and a region of said frame engaged with said support pole, thereby stably supporting said bicycle in a vertical storage position with said front wheel elevated.

5. The combination of claim 4, wherein said support pole has an engagement portion configured for engaging a saddle post of said bicycle.

6. The combination of claim 5, wherein said engagement portion of said support pole is configured for substantially encircling the saddle post of the bicycle.

7. A method for storing a bicycle having a front wheel and a back wheel both attached to a frame, the method comprising the steps of:
    (a) providing the bicycle rack of claim 1 standing on a flat underlying surface;
    (b) engaging the back wheel of the bicycle with said support structure; and
    (c) raising the bicycle into a vertical storage position so that an engagement portion of said support pole engages a region of the frame so as to support the bicycle in a vertical storage position with the front wheel elevated.

* * * * *